3,054,999
CORRELATION EVALUATOR

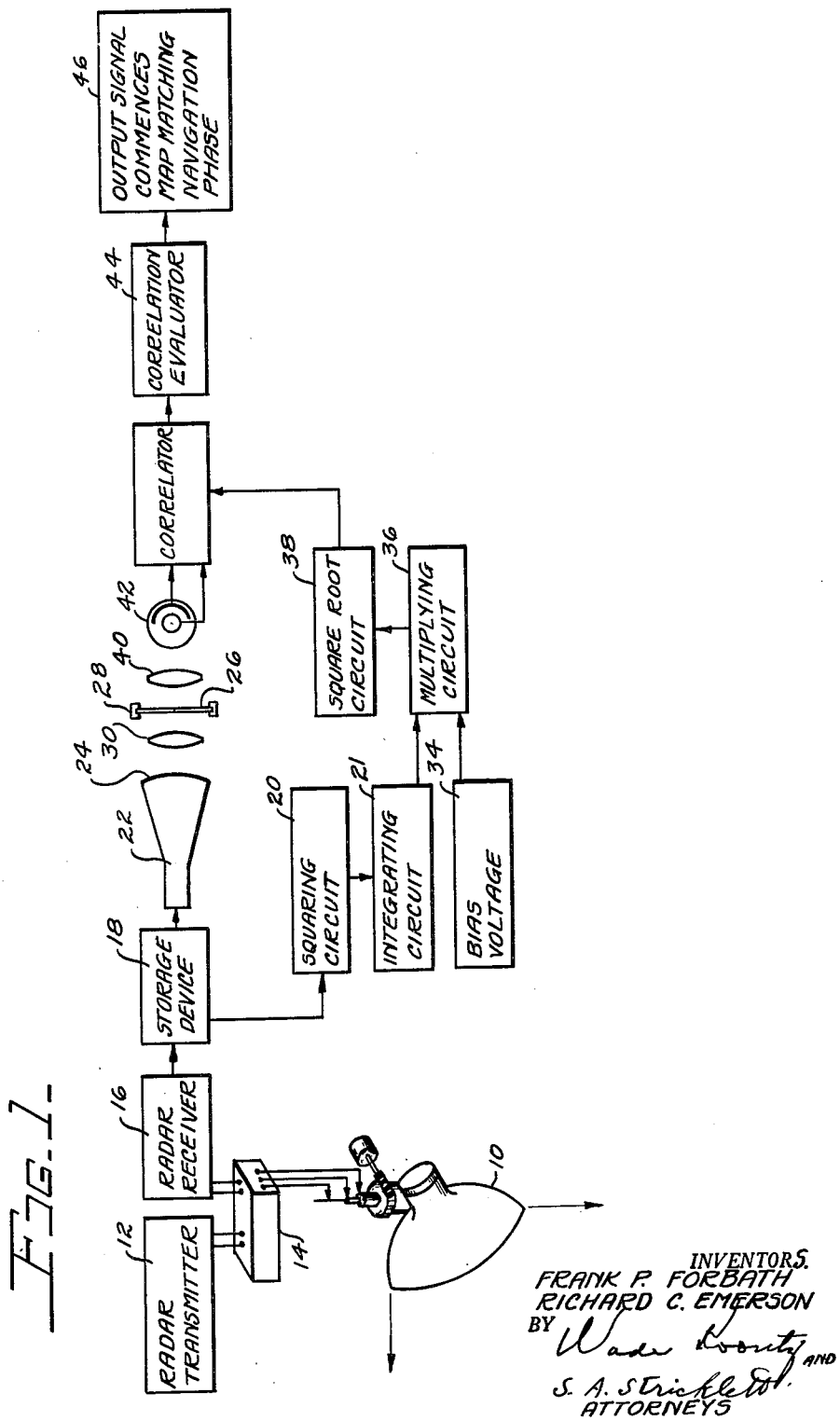

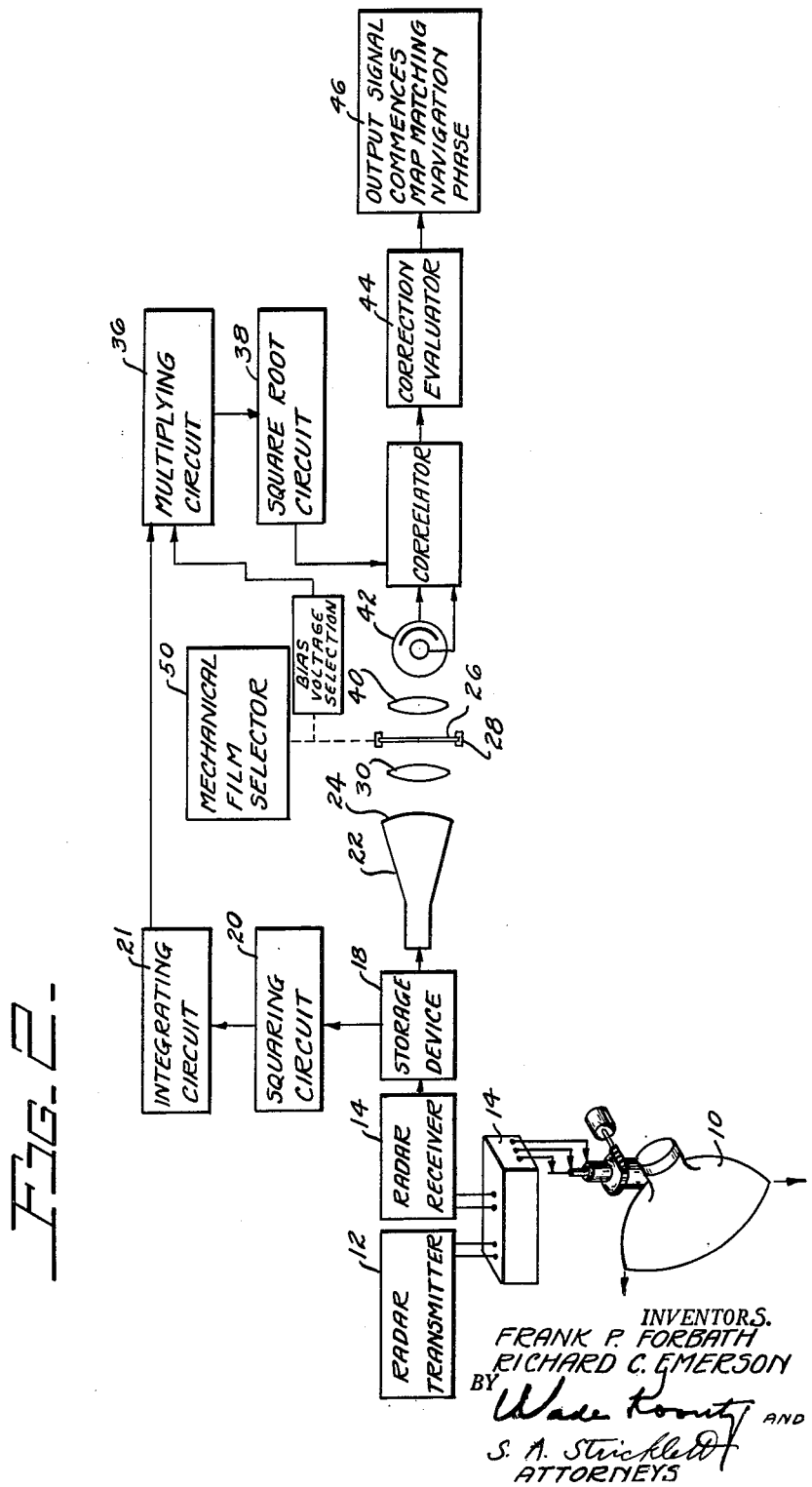

Frank P. Forbath, North Hollywood, and Richard C. Emerson, Los Angeles, Calif., assignors to the United States of America as represented by the Secretary of the Air Force
Filed July 20, 1955, Ser. No. 523,398
5 Claims. (Cl. 343—5)

This invention relates to a correlation coefficient evaluator for the searching phase of a map matching navigation system and particularly to a normalizing system for eliminating the errors in map selecting.

In the utilization of map matching navigation, it is customary to conduct a reconnaissance flight over the touchdown or target area and to provide a photographic map transparency corresponding to the ground return of a plan position indicator scanning the touchdown area. Also, it is customary to provide a plurality, preferably a succession of ground return transparency maps covering the route to the touchdown area. The succession of maps are preferably contiguous or slightly overlapping but may, if desired, be at spaced intervals over the route or may be omitted entirely utilizing only a transparency map of the touchdown area.

Map matching navigation then is in two steps. The first constitutes a search to match the field of view of the vehicle with a transparency, preferably a positive, map made on a previous voyage. After the search has resulted in selecting the ground return and the corresponding transparency the search is discontinued and map matching navigation is instituted to properly orient the vehicle with respect to the ground return.

Map matching technique has been developed for utilizing either negative or positive map transparencies, or films, to be matched with the ground return as displayed on a plan position indicator, P.P.I. scope. When a negative film or transparency is utilized the incident of match is indicated by a minimum of light transmittal, while the positive transparencies coincidence of the ground return and the transparency is indicated by a maximum of light transmittal.

With competent photographic reproduction the transparency may be constructed to correspond substantially identically with the brightness of the ground return on the plan position indicator. However, the brightness of the return on the plan position indicator may vary from time to time because of ground or atmospheric conditions or by electronic difference in the plan position indicator of the reconnaissance vehicles and the similar devices in the following vehicles.

Considerable difficulty has been encountered in properly selecting the proper transparency to conduct the navigation phase. The error in selection may be minimized by normalizing the matching functions between the ground return and the transparency. This not only compensates for the variations in ground reflective characteristics and mechanical variations but also reduces the danger of matching a weak ground return with a strong transparency or vice versa.

In the construction, according to the present invention, a ground return is provided by any suitable device such as a radar scanning system and the ground return is fed to a suitable storage system such as a magnetic tape, storage tube or the like and the stored return is read out to a squaring system which in turn supplies the squared return to an integrating system.

A suitable transparency or series of transparencies is then positioned before the plan position indicator and the ground return read out to the plan position indicator so that the light emitted from the plan position indicator will pass through the transparency and operate a photoelectric device to provide a correlation matching coefficient. Each film or transparency is provided previous to the flight with a matching function which is read out and supplied to a multiplying device which produces the product of this stored matching function and the squared and integrated matching function for the terrain now being viewed, after which a square root is taken to provide a normalizing matching coefficient to normalize the correlation matching coefficient received from the photosensitive device.

When a single transparency is utilized a plurality of successive ground returns is compared to find the ground return corresponding to the transparency and when a plurality of transparencies are utilized the transparencies are successively compared to the ground returns to determine the transparency coincident with the ground return. For this purpose the comparison of the matching functions is fed to a correlation evaluator which may be of any desired type but may conveniently be a storage tube or a magnetic recording tape and when the proper correlation is discovered suitable mechanisms will be energized to discontinue the search phase and to convert to a normal map matching navigation phase.

It is accordingly an object of the invention to provide an improved map matching system.

It is a further object of the invention to provide a normalized map matching function.

It is a further object of the invention to provide a preliminary match-search device having a minimum of error.

Other objects and many of the attendant advantages of this invention will be readily apparent from the following detailed description taken in conjunction with the accompanying drawing in which:

FIGURE 1 is a schematic illustration of a map searching system utilizing a single transparency; and FIGURE 2 is a similar illustration of a map searching system utilizing a plurality of transparencies.

In the illustrative construction according to FIGURE 1 a terrain searching device such as a radar antenna 10 is provided with radiant energy from a transmitter 12 through a conventional TR switch 14 and reflected energy or ground return is transmitted from the antenna 10 through the TR switch 14 to a radar receiver 16.

The ground return is fed from the receiver 16 to a suitable storage device 18, preferably in the form of a magnetic recording tape, or memory tube, but obviously any suitable storage device 18 can be utilized. The ground return is read out of the storage device 18 to a suitable squaring circuit 20 and the squared ground return then is fed to an integrating circuit 21.

At any suitable time the ground return is read out of the storage device 18 to a suitable plan position indicator scope 22 upon which the ground return will appear as a luminous or light emitting map on the screen 24 of the plan position indicator 22. As is well known the intensity of light emission from the screen 24 will vary throughout the surface in dependence upon the variations in reflecting coefficient of the portions of the field of view scanned by the antenna 10. A previously made transparency map 26 corresponds to a photographic reproduction of a ground return of the voyage terminal or target area and is preferably a positive transparency. A suitable carrier 28 will position the transparency 26 in light receiving relation with the screen 24 of the plan position indicator 22 and, if desired, a focusing system 30 may be placed between the screen 24 of the plan position indicator 22 and the transparency 26. The light transmitting characteristics of the transparency 26 will vary throughout the surface in accordance with the variation in reflecting coefficient of the terrain covered by the original ground return indication as produced on the transparency. A matching function is provided in any desired manner for the transparency 26 and when only a single transparency 26 is utilized this matching function may be supplied as a biasing potential from a source 34. This matching function or biasing potential and the squared and integrated ground return is fed to a multiplying circuit 36 to produce a product of the biasing potential and the squared and integrated ground return. This product is supplied to a square root extracting circuit 38 to provide a normalizing matching coefficient.

The light emitted from the plan position indicator 22 is transmitted through the transparency 26 and condensed by means of a suitable lens system 40 onto a photoelectric device 42 which produces a correlation matching coefficient proportional to the light transmitted. This correlation matching coefficient is combined with the normalizing matching coefficient in the correlator to provide a normalized matching function. The normalized matching function is then fed to a correlation evaluator 44 which is preferably in the form of a storage device from which the difference between the normalized matching function and a stored normalized matching function may be readily read out. When the difference reaches a predetermined minimum an impulse will be sent to a control device 46 which will cause discontinuation of the search phase and the institution of a normal map matching navigation interval.

It will thus be seen that by providing a normalized matching function, the errors due to variation in ground return will be substantially eliminated so that positive control of the map matching will be readily secured.

In the operation of the invention as shown in FIGURE 1, a reconnaissance voyage is made preferably approaching the touchdown or target area over the path to be followed by the guided vehicle. The reconnaissance vehicle secures a ground return of the touchdown area by suitable scanning device, which ground return is displayed on a plan position indicator scope. The displayed ground return is photographed and a positive transparency map, usually a film, constructed corresponding to the ground return.

With good photographic controls the transparency of the positive film can be made proportional to the brightness of the original image on the reconnaissance vehicles P.P.I. display. The map matching equipment effectively obtains a light intensity at the photo tube given by $$\psi(\Delta X, \Delta Y) = K \int_A \int S(X,Y) P(x+\Delta X, y+\Delta Y) dA$$

where $S(X, Y)$ is the scope brightness as a function of position $X, Y$ over the area $A$, $P(x, y)$ is the corresponding positive film transparency, $K$ is a constant and $\Delta X$ and $\Delta Y$ are relative displacements of the two images. It can be readily shown that the proper normalizing coefficient is $$K \sqrt{\int_A \int S^2(X,Y) dA \cdot \int_A \int P^2(x,y) dA}$$

or, in turn that

Norm $\psi(\Delta X \Delta Y)$ $$= \frac{\int_A \int S(X,Y) P(x+\Delta X, y+\Delta Y) dA}{\sqrt{\int_A \int S^2(X,Y) dA \int_A \int P^2(x,y) dA}} \leq 1.0$$

Norm $\psi(\Delta X, \Delta Y)$ is then the normalized matching function and its maximum value, obtained for zero displacement, can be seen to equal 1.0 for identical scope and transparency images. For all other displacements the value is less than 1.0.

The value of integral $\int_A \int P^2(x,y) dA$ can then be obtained in the laboratory be several methods, for example:

A. The subject film is illuminated uniform with one unit light power density (e.g. one lumen per square centimeter). The transmitted light is then converged upon a photoelectric cell where output voltages are calibrated in terms of the light excitation in such a way as to indicate the light density transmitted by the film (e.g. lumens per square centimeter). The calibration procedure would be as follows: Associate the photocell output voltage with the film area removed from the film area. Insert standard films of uniform transparency (i.e. no image) whose coefficients of transparency are .1, .2, .3, etc. Associate the photocell output voltage for the respective films with the film area multiplied by the respective coefficient, etc. The subject film, $P(x, y)$, is then inserted and the output reading on the calibrated scale is the numerical value of $\int_A \int P^2(x, y) dA$ in units of film area.

B. As before illuminate the subject uniformly with one unit light density. Scan the transmitted image with a television camera whose output voltages are squared and then integrated by passing them through a low pass filter, or use any of the other well-known means for integrating a voltage which varies with time. The integrated output voltages are then measured against a calibrated scale. The calibration procedure is the same as outlined above, in A.

The integral $\int_A \int S^2(X, Y) dA$ is determined in either of two ways:

(1) Scan the memory of the storage tube (this is the characteristic method by which storage tubes are "read out"). The read out voltages are then squared and integrated as described in "B" above. The output scale is calibrated as follows: Apply standard pulses to the radar receiver input of such an intensity as to illuminate the cathode ray tube uniformly to .1, .2, .3, etc. lumens per square centimeter. Associate the squared, integrated, storage tube output voltages with the respective number (.1, .2, .3, etc.) of squared lumens per square centimeter.

(2) Occasionally scan the screen 24 of the P.P.I. scope 22 with a television camera whose output voltages are squared and integrated as above. Calibrate this system in the same way as above.

The function $S(X,Y)$ is a measure of the light power density (i.e. per unit area) incident upon the transparency at the point designated $(X,Y)$. It can be measured in any appropriate units, for example lumens per square centimeter, etc. The particular units chosen are unimportant since they are cancelled out by the normalizing constant in Norm $\psi(\Delta X, \Delta Y)$. The function $P(x, y)$ is a dimensionless quantity measuring the ratio of the transmitted to the incident light for the transparency. For each point $(X,Y)$, $P(x, y)$ will be a number which is less than unity. As indicated, the symbol $K$ is dimensionless and is of no particular importance in the determination of Norm $\psi(\Delta X, \Delta Y)$. $A$ and $dA$ are measures of surface area and must be expressed, for example, in square centimeters if $S(X,Y)$ is measured in light power per square centimeter, etc. $\psi(\Delta X, \Delta Y)$ has the dimensions of light power and must be expressed, for example, in lumens if $S(X,Y)$ is expressed in lumens per unit area, etc. Norm $\psi(\Delta X, \Delta Y)$ is a dimensionless ratio less than or equal to unity. The integral $\int_A \int P^2(X,Y) dA$ has the dimension of surface area and must be interpreted, for example, in square centimeters if $A$ and $dA$ are expressed in square centimeters. etc. The integral $\int_A \int S^2(X,Y)dA$ has the dimensions of light power squared per unit area and must be measured, for example, in square lumens per square centimeter if $S(X,Y)$ is expressed in lumens per square centimeter and $dA$ is expressed in square centimeters, etc. The quantities $x$, $y$, $\Delta X$, and $\Delta Y$ are length measurements and must be expressed for example, in centimeters if $A$ and $dA$ are expressed in square centimeters, etc. The number 1.0 appearing on the right of the inequality sign in the third equation is dimensionless.

The integral $\int_A \int P^2(x,y)dA$ may be recorded in several ways, such as, a memory tube, a record tape, or may be on the edge of the transparency. Also when a single transparency is used, the value of the integral may be fed into the equipment as a fixed quantity as shown in FIGURE 1.

The search is then made by periodically comparing the stored normalized matching function with the normalized matching function found by the correlator.

In the modification according to FIGURE 2 a selector device 50 sequentially supplies transparencies 26 to the holder 28 and also connects a read-out device to supply a matching function, corresponding to the transparency being searched, to the multiplying device 36.

The control device 46 positions the selected transparency for the navigation phase. Usually the successive transparencies correspond to successive portions of the navigation path which may be contiguous or spaced as may be desired.

For purpose of illustration various embodiments of the invention have been shown and described according to the best present understanding thereof. However, it will be apparent to those skilled in the art that various changes in the construction and arrangement of the parts thereof may be readily resorted to without departing from the true spirit and scope of the invention.

We claim:

1. A correlation evaluator system for a map matching search device comprising means providing a ground return, said means including a light emitting surface in which the emitted light varies over the surface as a function of the reflection characteristics of the field of view of said means, a transparency map in which the light transmission varies throughout the area as a function of the reflection characteristics of a preselected field of view, a squaring circuit responsive to the ground return, an integrating circuit, a feed circuit supplying said squared value to said integrating circuit, a device adapted to supply a value dependent on the light transmission characteristic of said transparency, a multiplying circuit operative to produce the product of said squared and integrated value and said dependent value, means operative to give the square root of said product, a photo sensitive device responsive to the light transmitted through said transparency, means correlating said square root with the output of said photosensitive device.

2. A correlation evaluator system for a map matching search device comprising means providing a ground return, said means including a light emitting surface in which the emitted light varies over the surface as a function of the reflection characteristics of the field of view of said means, a transparency map in which the light transmission varies throughout the area as a function of the reflection characteristics of a preselected field of view, a squaring circuit responsive to the ground return, an integrating circuit, a feed circuit supplying said squared value to said integrating circuit, a storage device adapted to store a value dependent on the light transmission characteristic of said transparency, a multiplying circuit operative to supply the product of said squared and integrated value and said stored value, means operative to give the square root of said product, a photosensitive device responsive to the light transmitted through said transparency from said light emitting surface, correlator means for comparing the square root output with the output of said photosensitive device to provide an output signal, storage means providing a preselected signal and evaluator means responsive to a predetermined degree of match between said output signal and said stored signal to provide a control impulse.

3. For use in a map matching navigation system having a terrain scanning system for producing a ground return and a PPI scope with a light emitting surface operative to emit light variable over the surface in response to the intensity of the ground return, a correlation evaluator for increasing the accuracy of the search phase of map matching navigation comprising a storage device operative to record the ground return, a squaring system operative to square the ground return, an integrating device operative to integrate the squared ground return, a record device adapted to store a bias voltage corresponding to the light transmission characteristic of a map transparency, multiplying means operable to produce the product of said squared and integrated ground return and said stored bias voltage, means operable to take the square root of said product to provide a first signal representing a normalizing matching coefficient, means responsive to the light transmitted from said scope through a transparency to provide a second signal representing a correlation matching coefficient and correlator means operable to compare said first and second signals to provide an output signal representing a normalized matching function.

4. A correlation evaluator for increasing the accuracy of selection in the search phase of a map matching navigation system which comprises a scanning device operative to scan a field of view and receive a ground return therefrom, a storage device operative to record said ground return, means operable to read out said ground return, a squaring device operative to square said ground return, a plan position indicator including a light emitting surface operative to utilize said ground return to modify the light emitting characteristic of said surface whereby the intensity of light emission varies over said surface in dependence on the reflecting characteristics of the field of view, a transparency map corresponding to a ground return from a preselected field of view, the light transmission characteristics of said transparency varying throughout its area in dependence on the reflecting characterics of said preselected field of view, a storage device adapted to record a value dependent on the light transmitting characteristics of said transparency, an integrating device connected to receive said squared return, a multiplying device connected to receive said squared and integrated return and said stored value, said multiplying device being operative to provide the product of said squared and integrated return and said stored value, means operative to extract the square root of said product to supply a first signal representing a normalizing matching coefficient, a photoelectric device responsive to the light transmitted through said transparency from said surface to supply a second signal representing a correlation matching coefficient and means operative to normalize said first and second signals to provide a normalized output signal.

5. A terrain locating system comprising means providing a reflection from a field of view, a light emitting surface in which the emitted light varies over the surface in dependence on the varying reflecting coefficient over the field of view, a transparency map in which the light transmission varies throughout the area as a function of the reflecting coefficient over a preselected field of view, a light receiver, a carrier operative to position said transparency in light transmitting relation between said surface and said receiver, said receiver being responsive to the transmission of light from said surface through said transparency to said receiver to provide a voltage representing a correlation matching coefficient, a voltage source providing a voltage representing a matching function corresponding to the light transmitting characteristic of said transparency, means providing a voltage representing a matching characteristic responsive to the emitted light, circuit means operative to combine said voltage representing said matching characteristic with said voltage representing said matching function to provide a voltage representing a normalizing matching coefficient, correlator means operative to compare said voltage representing the correlation matching coefficient with said voltage representing the normalizing matching coefficient to provide a voltage representing a normalized matching function.

References Cited in the file of this patent

UNITED STATES PATENTS

| | | |
|---|---|---|
| 2,188,679 | Dovaston et al. | Jan. 30, 1940 |
| 2,199,608 | Barthelemy | May 7, 1940 |
| 2,523,296 | Harris | Sept. 26, 1950 |

FOREIGN PATENTS

| | | |
|---|---|---|
| 1,047,043 | France | Dec. 10, 1953 |